United States Patent
Furuta et al.

(10) Patent No.: US 12,454,480 B2
(45) Date of Patent: Oct. 28, 2025

(54) CRYSTALLIZED GLASS, CHEMICALLY STRENGTHENED GLASS, AND PRODUCTION METHOD THEREFOR

(71) Applicant: AGC Inc., Tokyo (JP)

(72) Inventors: Hitomi Furuta, Tokyo (JP); Takanori Fukushi, Tokyo (JP); Qing Li, Tokyo (JP); Yusuke Arai, Tokyo (JP)

(73) Assignee: AGC Inc., Tokyo (JP)

( * ) Notice: Subject to any disclaimer, the term of this patent is extended or adjusted under 35 U.S.C. 154(b) by 984 days.

(21) Appl. No.: 17/448,570

(22) Filed: Sep. 23, 2021

(65) Prior Publication Data

US 2022/0002189 A1 Jan. 6, 2022

Related U.S. Application Data

(63) Continuation of application No. PCT/JP2020/011304, filed on Mar. 13, 2020.

(30) Foreign Application Priority Data

Apr. 5, 2019 (JP) ................................. 2019-072736

(51) Int. Cl.
*B32B 9/00* (2006.01)
*C03C 10/00* (2006.01)

(52) U.S. Cl.
CPC ...... *C03C 10/0054* (2013.01); *C03C 2203/50* (2013.01)

(58) Field of Classification Search
CPC .................. C03C 10/0054; C03C 2203/50
USPC ............................................. 428/408
See application file for complete search history.

(56) References Cited

U.S. PATENT DOCUMENTS

| | | |
|---|---|---|
| 2015/0368140 A1 | 12/2015 | Ikemoto et al. |
| 2016/0102010 A1* | 4/2016 | Beall ............... C03C 21/002 501/4 |
| 2019/0071343 A1* | 3/2019 | Kanasugi ........... C03B 23/0307 |
| 2020/0115267 A1 | 4/2020 | Li et al. |
| 2020/0156994 A1 | 5/2020 | Li et al. |
| 2020/0207660 A1 | 7/2020 | Li et al. |

(Continued)

FOREIGN PATENT DOCUMENTS

| | | |
|---|---|---|
| CN | 103058525 A | 4/2013 |
| CN | 105683109 A | 6/2016 |

(Continued)

OTHER PUBLICATIONS

International Search Report issued May 26, 2020 in PCT/JP2020/011304 filed on Mar. 13, 2020, 2 pages.

(Continued)

*Primary Examiner* — Daniel H Miller
(74) *Attorney, Agent, or Firm* — Oblon, McClelland, Maier & Neustadt, L.L.P.

(57) ABSTRACT

The present invention relates to a glass ceramic having a three-dimensional shape including plural R-shapes including a smallest R-shape whose average radius of curvature is $5.0 \times 10^2$ mm or less and a largest R-shape whose average radius of curvature is $1.0 \times 10^3$ mm or more, having a maximum value of retardations of 20 nm/mm or less, and having a haze value converted into a value corresponding to a thickness of 0.8 mm of 1.0% or less in the largest R-shape.

15 Claims, 5 Drawing Sheets

(56) References Cited

U.S. PATENT DOCUMENTS

| | | |
|---|---|---|
| 2020/0239354 A1 | 7/2020 | Li et al. |
| 2020/0290917 A1 | 9/2020 | Kanasugi et al. |
| 2020/0346969 A1 | 11/2020 | Li et al. |

FOREIGN PATENT DOCUMENTS

| | | |
|---|---|---|
| CN | 106977084 A | 7/2017 |
| CN | 109320091 A | 2/2019 |
| CN | 109369021 A | 2/2019 |
| CN | 110372216 A | 10/2019 |
| JP | 2014-141356 A | 8/2014 |
| JP | 2017-190265 A | 10/2017 |
| JP | 2019-043834 A | 3/2019 |
| WO | WO 2014/167894 A1 | 10/2014 |
| WO | WO 2019/022034 A1 | 1/2019 |
| WO | WO 2019/022035 A1 | 1/2019 |
| WO | WO 2019/167850 A1 | 9/2019 |

OTHER PUBLICATIONS

Tian, Y. et al., "New Glass Technology", China Light Industry Press, vol. 1, Jun. 2009, pp. 80-81 (with partial English translation).

Gong, X. "Theoretical Basis and Application of Phase Change", Wuhan University of Technology Press, vol. 1, Dec. 2004, pp. 93 (with partial English translation).

\* cited by examiner

CRYSTALLIZED GLASS, CHEMICALLY STRENGTHENED GLASS, AND PRODUCTION METHOD THEREFOR

TECHNICAL FIELD

The present invention relates to glass ceramic and chemically strengthened glass each having a three-dimensional shape, that are high in transparency and superior in strength and formability as well as manufacturing methods thereof.

BACKGROUND ART

Cover glasses of display devices of mobile devices such as cellphones and smartphones and cover glasses of vehicular display members such as instrument panels and head-up displays (HUDs) are required to be high in strength and transparency. For example, chemically strengthened glass that is thin and has high strength is used for those kinds of cover glasses.

Glass having a three-dimensional shape including plural R-shapes is sometimes desired as glass used for such a cover glass to increase the operability or visibility. Example methods for manufacturing glass having a three-dimensional shape include a method of bend-forming in which a flat glass sheet is heated and then pressed using forming dies (also called three-dimensionally forming) (Patent document 1).

Whereas amorphous glass which contains no crystals is used as glass used for such a cover glass, glass ceramic which is higher in strength is also proposed (Patent document 2). Glass ceramic is glass in which crystals have been precipitated therein by subjecting it to heat treatment.

Example methods for obtaining glass ceramic having a three-dimensional shape include a method of performing bend-forming on amorphous glass while making crystals precipitated therein, a method of crystallizing amorphous glass and then subjecting resulting glass ceramic to bend-forming, a method of working glass ceramic into a three-dimensional shape by, for example, grinding, and a method of subjecting amorphous glass to bend-forming and then crystallizing resulting glass (Patent documents 3 and 4).

Patent document 2 discloses a manufacturing method of glass ceramic having a curved shape which includes a deforming step of deforming at least a part of sheet-like glass into a curved shape by external force acting on the sheet-like glass while making crystals precipitated in the sheet-like glass by keeping the temperature of the sheet-like glass in a first temperature range.

Patent document 3 discloses a manufacturing method of a glass ceramic bent sheet including a step of preparing a crystalline glass bent sheet by deforming a portion, in one direction, of a crystalline glass flat sheet in a state that the portion is softened by heating it locally and a crystallizing step of deforming and crystallizing the crystalline glass bent sheet by placing the crystalline glass bent sheet on a forming die and heating it, thereby obtaining a glass ceramic bent sheet.

CITATION LIST

Patent Literature

Patent document 1: WO 2014/167894
Patent document 2: WO 2019/022034
Patent document 3: JP-A-2017-190265
Patent document 4: JP-A-2014-141356

SUMMARY OF INVENTION

Technical Problems

In methods of manufacturing glass having a three-dimensional shape by bend-forming as described in Patent document 1, stress differences (retardations) are prone to occur in formed glass because heat unevenness occurs particularly in its curved portions during heating due to unevenness of contact between the glass and forming die. Furthermore, if the cooling rate is increased in the bend-forming to increase the productivity, large retardations occur in formed glass. Glass becomes prone to break and is decreased in strength as its retardations become large.

In obtaining glass ceramic having a three-dimensional shape, it is common to perform forming after crystallization. However, there is a problem that for certain glass compositions the haze is deteriorated by heating during forming and the transparency of the glass is thereby lowered. On the other hand, methods of performing crystallization after bend-forming have a problem that heat treatment for the crystallization is prone to cause deformation or reduction in transparency. In these circumstances, it was difficult to provide glass ceramic with a three-dimensional shape having high transparency, strength, and shape stability which are suitable for cover glasses.

An object of the present invention is to provide glass having a three-dimensional shape that is high in strength, transparency, and shape stability and a manufacturing method thereof.

Solution to Problem

As a result of diligent studies about glass compositions etc. in view of the above problems, the present inventors have found out glass having a three-dimensional shape that is high in strength, transparency, and shape stability and a manufacturing method thereof and completed the present invention.

The present invention provides a glass ceramic having a three-dimensional shape including plural R-shapes including a smallest R-shape whose average radius of curvature is $5.0 \times 10^2$ mm or less and a largest R-shape whose average radius of curvature is $1.0 \times 10^3$ mm or more,
  having a maximum value of retardations measured by the following measuring method of 20 nm/mm or less, and
  having a haze value converted into a value corresponding to a thickness of 0.8 mm of 1.0% or less in the largest R-shape:
(Measuring Method)
  a retardation is measured using a birefringence measuring instrument by perpendicularly irradiating one or more points on a circular arc of each R-shape with a light having a wavelength of 543 nm; but no retardation measurement is performed in a case that an angle formed by a tangential line of a curved surface of a central portion of a measurement sample and a tangential line of a measurement target surface is 90° or more.

The present invention relates to a chemically strengthened glass having a compressive stress layer in a surface thereof, having a three-dimensional shape including plural R-shapes including a smallest R-shape whose average radius of curvature is $5.0 \times 10^2$ mm or less and a largest R-shape whose average radius of curvature is $1.0 \times 10^3$ mm or more, having a surface compressive stress value ($CS_0$) of 500 MPa or more and a depth of a compressive stress layer (DOL) of 80 μm or more, being a glass ceramic including crystals, having a maximum value of retardations per a thickness of 1 mm of 20 nm/mm or less, measured by perpendicularly irradiating a central portion of the smallest R-shape with a light having a wavelength of 543 nm, and having a haze value converted into a value corresponding to a thickness of 0.8 mm of 1.0% or less in the largest R-shape.

The present invention relates to a manufacturing method of a glass ceramic having a three-dimensional shape, the method including:

obtaining a three-dimensionally shaped amorphous glass including plural R-shapes including a smallest R-shape whose average radius of curvature is $5.0\times10^2$ mm or less and a largest R-shape whose average radius of curvature is $1.0\times10^3$ mm or more by bend-forming an amorphous glass while heating it, the amorphous glass including, in mass % in terms of oxides:
58-74% of $SiO_2$;
5-30% of $Al_2O_3$;
1-14% of $Li_2O$;
0-5% of $Na_2O$;
0-2% of $K_2O$;
0.5-12% of at least one of $SnO_2$ and $ZrO_2$ in total; and
0-6% of $P_2O_5$; and crystallizing the three-dimensionally shaped amorphous glass by heat treatment to obtain a glass ceramic having a three-dimensional shape.

The present invention relates to a manufacturing method of a chemically strengthened glass having a three-dimensional shape, the method including:

obtaining a three-dimensionally shaped amorphous glass including plural R-shapes including a smallest R-shape whose average radius of curvature is $5.0\times10^2$ mm or less and a largest R-shape whose average radius of curvature is $1.0\times10^3$ mm or more by bend-forming an amorphous glass while heating it, the amorphous glass including, in mass % in terms of oxides:
58-74% of $SiO_2$,
5-30% of $Al_2O_3$,
1-14% of $Li_2O$;
0-5% of $Na_2O$;
0-2% of $K_2O$;
0.5-12% of at least one of $SnO_2$ and $ZrO_2$ in total; and
0-6% of $P_2O_5$;

crystallizing the three-dimensionally shaped amorphous glass by heat treatment to obtain a glass ceramic having a three-dimensional shape; and chemically strengthening the glass ceramic having a three-dimensional shape.

Advantageous Effects of Invention

The glass having a three-dimensional shape of the present invention is not prone to break and is high in strength and forming stability because it has a three-dimensional shape including plural R-shapes including the smallest R-shape whose average radius of curvature is $5.0\times10^2$ mm or less and the largest R-shape whose average radius of curvature is $1.0\times10^3$ mm or more and has a maximum value of retardations per a thickness of 1 mm measured by perpendicularly irradiating the smallest R-shape with light having a wavelength of 543 nm of 20 nm/mm or less. Furthermore, the glass having a three-dimensional shape of the present invention is high in transparency because a haze value converted into a value corresponding to a thickness of 0.8 mm is 1.0% or less in the largest R-shape.

The manufacturing methods of a glass having a three-dimensional shape of the present invention can increase the strength by lowering retardations that occur during forming because the manufacturing methods include the step of obtaining three-dimensionally shaped amorphous glass by bend-forming an amorphous glass having a particular composition while heating it and the subsequent step of crystallizing the three-dimensionally shaped amorphous glass by heat treatment. Furthermore, high transparency can be realized by suppressing haze deterioration due to heating during the forming.

DESCRIPTION OF EMBODIMENTS

Figure 1:
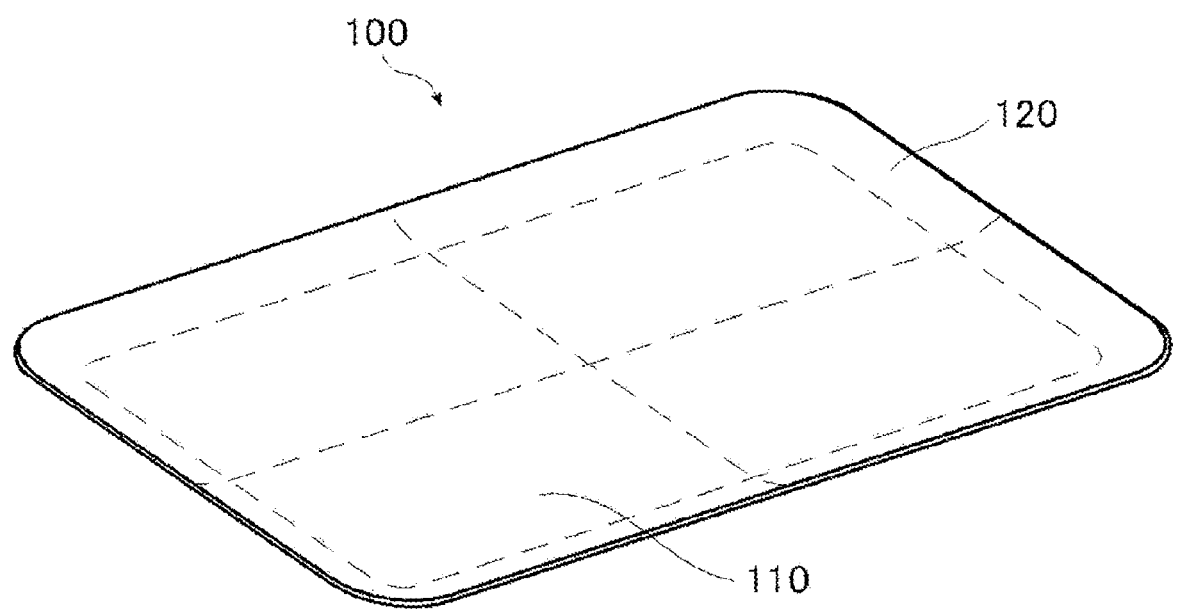
FIG. 1 is a perspective view showing an example shape of glass having a three-dimensional shape of the present invention.

In this specification, the symbol indicating a numerical value range is used in such a sense that the range includes the numerical values written before and after it as the lower limit value and the upper limit value respectively. In this specification, the symbol "-" is used in this sense unless otherwise specified.

In this specification, "amorphous glass" and "glass ceramic" are together referred to as "glass." In this specification, the term "amorphous glass" means glass in which no diffraction peak indicating a crystal is found by a powder X-ray diffraction method. The term "glass ceramic" means glass obtained by subjecting "amorphous glass" to heat treatment to make crystals precipitated therein and hence contains crystals.

Powder X-ray diffraction measurement is performed using CuK α-rays in a 2θ range of 10° to 80°. If a diffraction peak is found, precipitated crystals are identified by Hanawalt method, for example.

In the following description, the term "chemically strengthened glass" means glass obtained through chemical strengthening treatment and the term "glass for chemical strengthening" means glass before being subjected to chemical strengthening treatment.

The term "base composition of a chemically strengthened glass" means a glass composition of glass for chemical strengthening. A glass composition of a portion, deeper than depth of compressive stress layer (DOL), of chemically strengthened glass is a base composition of the chemically strengthened glass except for a case where the glass has been subjected to extreme ion exchange treatment.

In this specification, a glass composition is represented in mass % in terms of oxides unless otherwise specified and mass % may be written simply as "%."

In this specification, the expression "substantially not containing" means that the content is smaller than or equal to a level of an impurity contained in a raw material or the like, that is, a substance concerned is not added intentionally. In this specification, specifically, a phrase "substantially not containing a certain component" means that the content of this component is smaller than 0.1%, for example.

In this specification, the term "stress profile" means a variation of the compressive stress value with the depth from the glass surface as a variable. In a stress profile, tensile stress is expressed as negative compressive stress.

A "compressive stress value (CS)" or a "surface compressive stress value ($CS_0$)" can be measured by forming a thin-piece sample from a cross section of glass and analyzing the thin-piece sample by a birefringence imaging system. An example birefringence imaging system is the birefringence imaging system "Abrio-IM" produced by Tokyo Instruments, Inc. A "compressive stress value (CS)" or a "surface compressive stress value ($CS_0$)" can also be measured utilizing scattered light photoelasticity. This method can measure a CS value by irradiating the surface of glass with light and analyzing polarization of scattered light. An example stress measuring instrument utilizing scattered light photoelasticity is the scattered light photoelasticity stress meter "SLP-1000" produced by Orihara Manufacturing Co., Ltd.

In this specification, the term "depth of compressive stress layer (DOL)" means a depth at which the compressive stress value (CS) is 0. In this specification, the term "internal tensile stress (CT)" means a tensile stress value at a depth that is equal to ½ of a sheet thickness t.

In this specification, the term "retardation" means a value obtained by measuring a retardation using a birefringence meter by irradiating a major surface of a glass sheet from a direction perpendicular to it with light having a wavelength of 543 nm and converting the measurement value into a value corresponding to a thickness of 0.55 mm. Example birefringence meters are "WPA-100" and "WPA-200" produced by Photonic Lattice, Inc.

In this specification, the term "light transmittance" means an average transmittance of visible light in a wavelength range of 380 to 780 nm. The term "haze value" means a value measured according to JIS K3761: 2000 using a C light source. The expression "haze value converted into a value corresponding to a thickness of 0.8 mm" means a haze value that is obtained after working into a thickness of 0.8 mm if the thickness of a measurement target is not equal to 0.8 mm. Or the expression "haze value converted into a value corresponding to a thickness of 0.8 mm" means a haze value corresponding to a thickness of 0.8 mm calculated on the basis of a haze value measured with an original thickness and a haze value measured after working into a different thickness.

In this specification, the term "thermal expansion coefficient" means an average thermal expansion coefficient from 50° C. to 500° C. (unless otherwise specified) measured with a temperature increasing rate 10° C./min according to JIS R1618: 2002. The term "glass transition point" means a value that is determined from this thermal expansion curve.

In this specification, the term "Vickers hardness" means Vickers hardness (HV 0.1) that is prescribed in JIS R1610: 2003.

A "fracture toughness value" can be measured by a DCDC method (Acta Metall. Mater. Vol. 43, pp. 3,453-3, 458, 1995).

<Glass having Three-Dimensional Shape>

The glass having a three-dimensional shape of the present invention includes glass ceramic having a three-dimensional shape and chemically strengthened glass having a three-dimensional shape. In the invention, the term "three-dimensional shape" means a shape that includes plural R-shapes including the smallest R-shape whose average radius of curvature is $5.0 \times 10^2$ mm or less and the largest R-shape whose average radius of curvature is $1.0 \times 10^3$ mm or more. The term "three-dimensional shape" employed in the invention includes a curved shape including a continuous curve, a shape that is curved in the vertical direction and the horizontal direction, and a shape having projections and recesses formed in a flat sheet.

FIG. 1, FIG. 2A, FIG. 2B, and FIG. 3A and FIG. 3B show examples of glass having a three-dimensional shape of the present invention. Whereas each of these figures shows glass having a three-dimensional shape the whole of which is uniform in thickness, a three-dimensional shape may be a shape having a portion with a different thickness.

A glass having a three-dimensional shape 100 shown in FIG. 1 has a peripheral portion 120 around a central portion 110 which is generally flat and includes the smallest R-shape between the central portion 110 and the peripheral portion 120 and the largest R-shape in the central portion 110 which is generally flat.

Figure 2A:
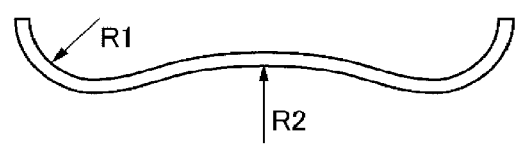
FIG. 2A and FIG. 2B are a front view and a perspective view respectively, showing another example shape of glass having a three-dimensional shape of the present invention.
Figure 2B:
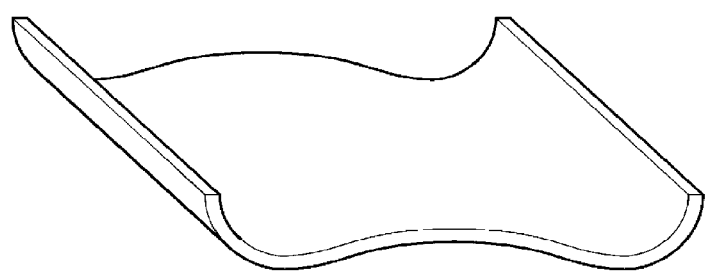

FIG. 2A and FIG. 2B show glass that is shaped so as to include, in two respective end portions of an inside, back surface, a pair of smallest R-shapes that have an average radius of curvature R1 and are curved so as to go away from an outer, front surface as the position goes toward the two respective ends, and to also include the largest R-shape that has an average radius of curvature R2 and is curved so as to be convex upward (as view in the figure).

Figure 3A:
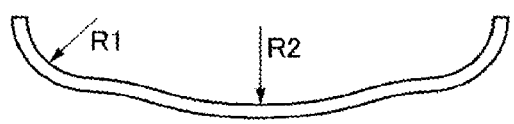
FIG. 3A and FIG. 3B are a front view and a perspective view respectively, showing another example shape of glass having a three-dimensional shape of the present invention.
Figure 3B:
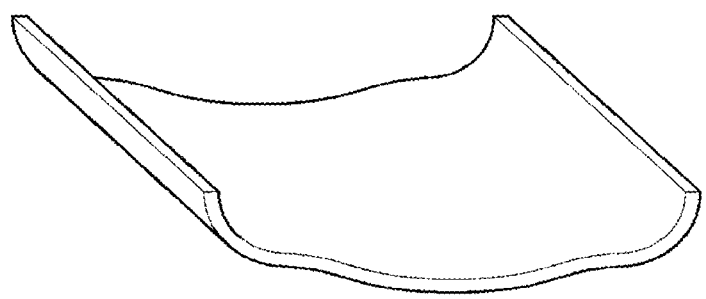

FIG. 3A and FIG. 3B show glass that is shaped so as to include, in two respective end portions of an inside, back surface, a pair of smallest R-shapes that have an average radius of curvature R1 and are curved so as to go away from an outer, front surface as the position goes toward the two respective ends, and to also include the largest R-shape that has an average radius of curvature R2 and is curved so as to be convex downward (as view in the figure).

The average curvature is a physical index indicating how a surface is deviated from a flat surface. How to derive an average curvature mathematically is known and will not be described in this specification. Stated briefly, an average curvature of a surface is defined as an intermediate value between the maximum value and the minimum value of curvatures of a revolution body obtained by rotating the curved surface around a normal vector of the curved surface at a certain point on the surface. An average radius of curvature of a surface is defined as the reciprocal of an average curvature.

The following is a specific example. An average curvature, at an arbitrary point on the spherical surface, of a sphere having a radius R is 1/R. For another example, an average curvature, at an arbitrary point on the side surface of a cylinder whose bottom surface has a radius R is ½R because its maximum curvature is 1/R and minimum curvature is 0. As such, an average curvature value at a certain point on a surface is an important parameter representing a physical shape. An average curvature can be measured by any of known methods.

The average radius of curvature R1 of the smallest R-shape is $5.0 \times 10^2$ mm or less, preferably $1.0 \times 10^2$ mm or less and even preferably $5.0 \times 10^1$ mm or less. It is preferable that the average radius of curvature R1 be 1.0 mm or more, even preferably 2.5 mm or more and further preferably 5.0 mm or more. It is preferable that the bend angle of the smallest R-shape be 1° or more, even preferably 10° or more and further preferably 20° or more. It is preferable that the bend angle of the smallest R-shape be 89° or less, even preferably 80° or less and further preferably 75° or less.

The average radius of curvature R2 of the largest R-shape is $1.0 \times 10^3$ mm or more, preferably $2.5 \times 10^3$ mm or more and even preferably $5.0 \times 10^3$ mm or more. It is preferable that the average radius of curvature R2 of the largest R-shape is $4.0 \times 10^5$ mm or less, even preferably $2.0 \times 10^5$ mm or less and further preferably $1.0 \times 10^5$ mm or less. It is preferable that the bend angle of the largest R-shape be more than 0° and 10.0° or less, even preferably more than 0° and 8.0° or less and further preferably more than 0° and 5.0° or less.

Stress remaining inside the glass having a three-dimensional shape of the present invention can be evaluated using a retardation as an index. For example, let $\Delta n$ represent a refractive index difference (refractive index anisotropy) between a refractive index for light having first linear polarization and a prescribed wavelength and a refractive index for light having second linear polarization perpendicular to the first linear polarization that are measured using, for example, a birefringence measuring instrument; and let t (nm) represent a thickness of a central portion of the present glass having a three-dimensional shape.

A level of a residual stress may be evaluated using a thus-measured retardation $\Delta n \times t$ (nm). Instead of using a thickness t (nm) of a central portion of an actual glass having a three-dimensional shape as it is, a retardation may be evaluated in the form of a retardation per 1 mm, $\Delta n \times d$ (nm/mm), where d=t (nm)/t (mm).

In the glass having a three-dimensional shape of the present invention, a maximum value of retardations measured by the following measuring method is 20 nm/mm or less, preferably 18 nm/mm or less and even preferably 16 nm/mm or less. A retardation value is measured for at least one cross section.

(Measuring Method)

A retardation is measured using a birefringence measuring instrument by perpendicularly irradiating one or more points on a circular arc of each R-shape with light having a wavelength of 543 nm. However, no retardation measurement is performed in a case where the angle formed by a tangential line of a curved surface of a central portion of a measurement sample and a tangential line of a measurement target surface is 90° or more.

The magnitude of a retardation depends on stress in glass. A maximum value of retardations being small means that a stress difference in the glass is small. Since the maximum value of retardations is 20 nm/mm or less, the glass having a three-dimensional shape of the present invention is not prone to break and is high in strength and forming stability. There are no particular limitations on the lower limit of the maximum value of retardations, usually it is 1 nm/mm or more.

In the glass having a three-dimensional shape of the present invention, a haze value converted into a value corresponding to a thickness of 0.8 mm in the largest R-shape is 1.0% or less, preferably 0.8% or less, even preferably 0.5% or less, further preferably 0.4% or less, extremely preferably 0.3% or less, and most preferably 0.25% or less. Since the haze value is 1.0% or less, the glass having a three-dimensional shape of the present invention can realize high transparency and hence is suitable for, for example, a cover glass of a display unit of a cellphone or the like.

On the other hand, where it is difficult to reduce haze unless the crystallization ratio is lowered, it is preferable that the haze value converted into a value corresponding to a thickness of 0.8 mm in the largest R-shape be 0.05% or more, even preferably 0.08% or more to increase the mechanical strength.

In the glass having a three-dimensional shape of the present invention, it is preferable that the light transmittance converted into a value corresponding to a thickness of 0.8 mm in the largest R-shape be 85% or more, even preferably 87% or more, further preferably 88% or more, and particularly preferably 89% or more. Where the light transmittance is 85% or more, it is easy to see the screen when the glass having a three-dimensional shape of the present invention is used as a cover glass of a display of a cellphone.

Although it is preferable that the light transmittance be as high as possible, usually it is 91% or less or 90% or less. The light transmittance of 91% is equivalent to the light transmittance of common amorphous glass.

Being glass ceramic, the glass having a three-dimensional shape of the present invention is higher in strength than amorphous glass and is less prone to be scratched than amorphous glass because of large Vickers hardness. To increase the wear resistance, it is preferable that the Vickers hardness be 700 or more, even preferably 740 or more and further preferably 780 or more. On the other hand, the glass having a three-dimensional shape may be difficult to work if its Vickers hardness is too large. Thus, it is preferable that the Vickers hardness be 1,100 or less, even preferably 1,050 or less and further preferably 1,000 or less.

<Glass Ceramic>

The glass ceramic of the present invention is included in the above-described glass having a three-dimensional shape and is glass ceramic having a three-dimensional shape.

To suppress occurrence of a warp when chemically strengthening treatment is performed, it is preferable that the Young's modulus of the glass ceramic of the present invention be 80 GPa or more, even preferably 85 GPa or more, further preferably 87 GPa or more, and particularly preferably 90 GPa or more. If the Young's modulus is too large, it becomes difficult to perform working such as polishing. Thus, to increase the workability, it is preferable that the Young's modulus be 130 GPa or less, even preferably 125 GPa or less and further preferably 120 GPa or less.

It is preferable that the fracture toughness value of the glass ceramic of the present invention be 0.8 MPa·m$^{1/2}$ or more, even preferably 1 MPa·m$^{1/2}$ or more. Where the fracture toughness value is within this range, fragments are less prone to be scattered when the strengthened glass is broken.

It is preferable that the average thermal expansion coefficient of the glass ceramic of the present invention in a range of 50° C. to 500° C. be $30 \times 10^{-7}$/° C. or less, even preferably $25 \times 10^{-7}$/° C. or less, further preferably $20 \times 10^{-7}$/° C. or less, and particularly preferably $15 \times 10^{-7}$/C. or less. Usually, the average thermal expansion coefficient in the range of 50° C. to 500° C. is $10 \times 10^{-7}$/° C. or more.

It is preferable that the glass ceramic of the present invention contain lithium aluminosilicate crystals. Glass ceramic containing lithium aluminosilicate crystals is given high strength because precipitated crystals are also strengthened by chemically strengthening treatment.

When it is desired to increase the strength after chemical strengthening, it is preferable that the glass ceramic of the present invention contain β-spodumene crystals. β-spodumene crystals, which are represented by $LiAlSi_2O_6$, are lithium aluminosilicate crystals having diffraction peaks at Bragg angles (2θ) of 25.55°±0.05°, 22.71°±0.05°, and 28.20°±0.05° in an X-ray diffraction spectrum.

Figure 4:
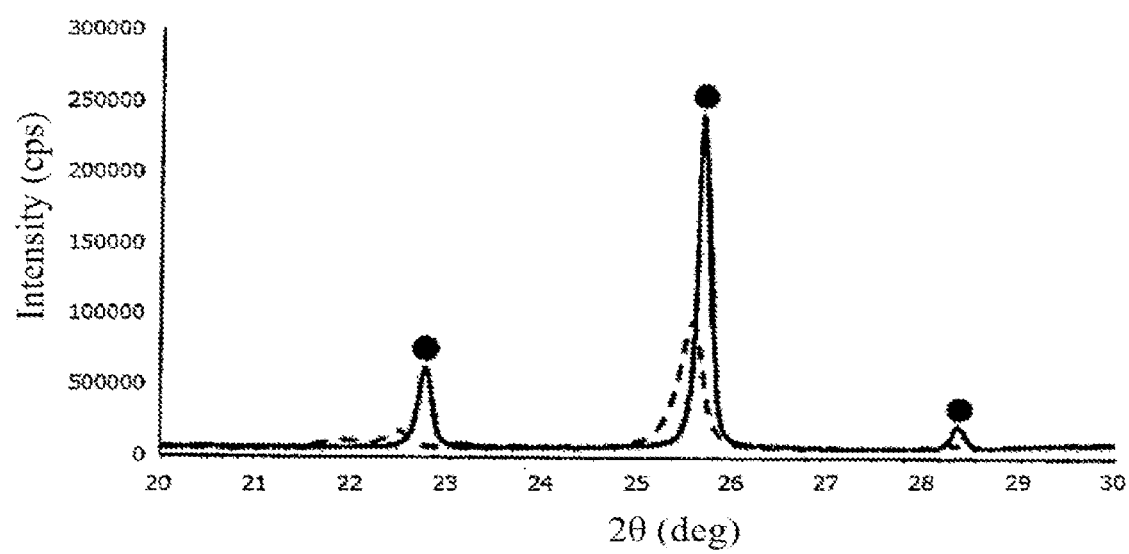
FIG. 4 shows example X-ray diffraction patterns of glass ceramics.

FIG. 4 shows example X-ray diffraction patterns of glass ceramic containing β-spodumene crystals and strengthened glass ceramic (chemically strengthened glass). In FIG. 4, a solid line shows a measured X-ray diffraction pattern of a glass ceramic sheet before strengthening in which diffraction lines of β-spodumene crystals are indicated by black circles. A broken line shows a measured X-ray diffraction pattern of a glass ceramic sheet after the strengthening (chemically strengthened glass).

Glass ceramic containing β-spodumene crystals tends to be increased more in surface compressive stress value ($CS_0$) by chemical strengthening than glass ceramic containing crystals of other kind. This is considered because β-spodumene crystals have a dense crystal structure and hence a change in crystal structure that occurs when ions in precipitated crystals are replaced by larger ions by ion exchange treatment for chemical strengthening produces large compressive stress and thereby enhances the effect of the chemical strengthening.

It is known that the crystal growth rate of β-spodumene crystals is high. Thus, in glass ceramic containing β-spodumene crystals, crystals contained therein tend to become bigger more easily. Thus, in many cases, glass ceramic containing β-spodumene crystals is low in transparency and has a large haze value. In contrast, the glass ceramic of the present invention contain many minute crystals and hence is high in transparency and small in haze value.

To increase the mechanical strength, it is preferable that the crystallization ratio of the glass ceramic of the present invention be 10% or more, even preferably 15% or more, further preferably 20% or more, and particularly preferably 25% or more. On the other hand, it is preferable that the crystallization ratio be 95% or less, even preferably 90% or less and particularly preferably 85% or less. Making the crystallization ratio smaller than or equal to 80% can increase the transparency and facilitates bend forming etc. by heating.

A crystallization ratio can be calculated from X-ray diffraction intensity by a Rietveld method, which is described in "Crystal Analysis Handbook" edited by Crystal Analysis Handbook editing committee of The Crystallographic Society of Japan, Kyoritsu Shuppan Co., Ltd., 1999, pp. 492-499.

It is preferable that the average particle diameter of precipitated crystals of the glass ceramic of the present invention be 300 nm or less, even preferably 200 nm or less and further preferably 150 nm or less. An average particle diameter of precipitated crystals can be calculated from powder X-ray diffraction intensity by the Rietveld method.

It is preferable that the glass ceramic of the present invention include, in mass % in terms of oxides, 58-74% of $SiO_2$, 5-30% of $Al_2O_3$, 1-14% of $Li_2O$, 0-5% of $Na_2O$, and 0-2% of $K_2O$ and, even preferably, 0.5-12% in total of at least one of $SiO_2$ and $ZrO_2$ and 0-6% of $P_2O_5$. It is further preferable that the composition include $Li_2O$ at 2-14% and it is particularly referable that the content of $Na_2O$ plus $K_2O$ is 1-5%.

Furthermore, it is even preferable that the glass ceramic include, in mass % in terms of oxides, 58-70% of $SiO_2$, 15-30% of $Al_2O_3$, 2-10% of $Li_2O$, 0-5% of $Na_2O$, 0-2% of $K_2O$, 0.5-6% of $SnO_2$, 0.5-6% of $ZrO_2$, and 0-6% of $P_2O_5$, and that the content of $Na_2O$ plus $K_2O$ be 1-5%.

That is, it is preferable that the glass ceramic of the present invention be glass ceramic obtained by crystallizing amorphous glass having the above composition.

<Chemically Strengthened Glass>

It is preferable that the glass having a three-dimensional shape of the present invention be chemically strengthened glass. That is, the chemically strengthened glass of the present invention is included in the above-described glass having a three-dimensional shape and is chemically strengthened glass having a three-dimensional shape.

It is preferable that the surface compressive stress value ($CS_0$) of the chemically strengthened glass of the present invention be 500 MPa or more because such chemically strengthened glass is not prone to be broken by deformation such as a warp. It is preferable that the surface compressive stress value of the chemically strengthened glass of the present invention be 600 MPa or more, even preferably 800 MPa or more and particularly preferably 1,000 MPa or more.

It is preferable that the depth of compressive stress layer (DOL) of the chemically strengthened glass of the present invention be 80 μm or more because such chemically strengthened glass is not prone to break even when its surface is scratched. It is even preferable that the DOL be 90 μm or more, further preferably 100 μm or more and particularly preferably 120 μm or more.

It is even preferable that a maximum depth at which the compressive stress value is 50 MPa or more (hereinafter may be referred to as "50 MPa depth") be 80 μm or more because such chemically strengthened glass is not prone to break even when it is dropped onto a hard surface such as an asphalt surface. It is further preferable that the 50 MPa depth be 90 μm or more and particularly preferably 100 μm or more.

It is preferable that the internal tensile stress (CT) of the chemically strengthened glass of the present invention be 110 MPa or less because in such chemically strengthened glass fragments not prone to be scattered when the strengthen glass is broken. It is even preferable that CT be 100 MPa or less, further preferably 90 MPa or less. On the other hand, as CT is made smaller, CS decreases to cause a tendency that a sufficient strength is difficult to be obtained. Thus, it is preferable that CT be 50 MPa or more, even preferably 55 MPa or more and further preferably 60 MPa or more.

It is preferable that the 4-point bending strength of the chemically strengthened glass of the present invention be 900 MPa or more, even preferably 1,000 MPa or more and further preferably 1,100 MPa or more. Four-point bending strength is measured using a test piece measuring 40 mm×5 mm×0.8 mm under conditions that the bottom span is 30 mm, the top span is 10 mm, and the cross-head speed is 0.5 mm/min. An average value of 10 test pieces is employed as 4-point bending strength.

The chemically strengthened glass of the present invention have approximately the same light transmittance and haze value as glass having a three-dimensional shape before being subjected to chemical strengthening. It is preferable that the chemically strengthened glass of the present invention include β-spodumene crystals like glass having a three-dimensional shape before being subjected to chemical strengthening do.

The chemically strengthened glass of the present invention tends to have Vickers hardness that is larger than a value of glass having a three-dimensional shape before being subjected to chemical strengthening. It is preferable that the Vickers hardness of the chemically strengthened glass of the present invention be 720 or more, even preferably 740 or more, further preferably 780 or more, and even further preferably 800 or more. The Vickers hardness of the chemically strengthened glass of the present invention is usually 950 or less.

<Manufacturing Method of Glass Ceramic having Three-Dimensional Shape>

The manufacturing method of glass ceramic having a three-dimensional shape of the present invention includes the following steps (1) and (2):

(1) a step of obtaining three-dimensionally shaped amorphous glass by bend-forming amorphous glass while heating it; and (2) a step of obtaining glass ceramic having a three-dimensional shape by crystallizing the three-dimensionally shaped amorphous glass by heat treatment.

Each step will be described below.

(1) Step of Obtaining Three-Dimensionally Shaped Amorphous Glass by Performing Forming in which Amorphous Glass is Set on a Forming Die and Heated Step (1) is a step of obtaining three-dimensionally shaped amorphous glass by forming amorphous glass into a warped shape by performing bend forming thereon.

(Amorphous Glass)

It is preferable that the amorphous glass have a composition that includes, in mass % in terms of oxides, 58-74% of $SiO_2$, 5-30% of $Al_2O_3$, 1-14% of $Li_2O$, 0-5% of $Na_2O$, 0-2% of $K_2O$, 0.5-12% in total of at least one of $SnO_2$ and $ZrO_2$, and 0-6% of $P_2O_5$. It is even preferable that the composition include $Li_2O$ at 2-14% and it is even further preferable that the content of $Na_2O$ plus $K_2O$ is 1-5%.

Furthermore, it is even preferable that the amorphous glass include, in mass % in terms of oxides, 58-70% of $SiO_2$, 15-30% of $Al_2O_3$, 2-10% of $Li_2O$, 0-5% of $Na_2O$, 0-2% of $K_2O$, 0.5-6% of $SnO_2$, 0.5-6% of $ZrO_2$, and 0-6% of $P_2O_5$, and that the content of $Na_2O$ plus $K_2O$ be 1-5%.

The above glass compositions will be described below.

$SiO_2$ is a component for constituting a glass network structure. Furthermore, $SiO_2$ is a component for increasing the chemical durability, a component of lithium aluminosilicate crystals, and a component of lithium silicate crystals. It is preferable that the content of $SiO_2$ be 58% or more, even preferably 60% or more and further preferably 64% or more. On the other hand, since the meltability lowers to a large extent if the content of $SiO_2$ is too large, it is preferable that the content of $SiO_2$ be 74% or less, even preferably 70% or less, further preferably 68% or less, and particularly preferably 66% or less.

$Al_2O_3$ is a component that is effective in increasing the compressive stress produced by chemical strengthening and is indispensable. Furthermore, $Al_2O_3$ is a component of lithium aluminosilicate crystals. It is preferable that the content of $Al_2O_3$ be 5% or more, and it is even preferable that the content of $Al_2O_3$ be 15% or more when it is desired to precipitate β-spodumene crystals. It is further preferable that the content of $Al_2O_3$ be 20% or more. On the other hand, since the glass devitrification temperature becomes high if the content of $Al_2O_3$ is too large. It is preferable that the content of $Al_2O_3$ be 30% or less, even preferably 25% or less.

$Li_2O$ is a component for producing compressive stress by ion exchange, a component of lithium aluminosilicate crystals, and is indispensable. It is preferable that the content of $Li_2O$ be 1% or more, even preferably 2% or more and further preferably 4% or more. On the other hand, it is preferable that the content of $Li_2O$ be 14% or less. When it is desired to precipitate β-spodumene crystals, it is even preferable that the content of $Li_2O$ be 10% or less, further preferably 8% or less and particularly preferably 6% or less.

To produce glass ceramic containing β-spodumene crystals, the content ratio, $Li_2O/Al_2O_3$, of $Li_2O$ to $Al_2O_3$ being 0.3 or less is preferable because the transparency is made high. This is considered due to a phenomenon that crystallization proceeds quickly during heat treatment to produce large crystal sizes.

$Na_2O$ is a component for increasing the glass meltability. Although $Na_2O$ is not indispensable, it is preferable that its content be 0.5% or more, even preferably 1% or more. If the content of $Na_2O$ is too large, lithium aluminosilicate crystals less tend to precipitate or the chemical strengthening properties lower. It is therefore preferable that the content of $Na_2O$ be 5% or less, even preferably 4% or less and further preferably 3% or less.

$K_2O$ is a component for lowering the glass melting temperature like $Na_2O$ and may be contained. Where $K_2O$ is contained, it is preferable that its content be 0.5% or more, even preferably 1% or more. It is preferable that the total content, $Na_2O+K_2O$, of $Na_2O$ and $K_2O$ be 1% or more, even preferably 2% or more.

Since lithium aluminosilicate crystals less tend to precipitate if the content of $K_2O$ is too large, it is preferable that the content of $K_2O$ be 2% or less. If the total content, $Na_2O+K_2O$, of $Na_2O$ and $K_2O$ is excessive, acceleration of crystallization during heat treatment may be impaired to lower the transparency. To obtain high transparency, it is preferable that their total content be 5% or less, even preferably 4% or less and further preferably 3% or less.

Although neither of $ZrO_2$ and $SnO_2$ are indispensable, they are components for constituting crystal nuclei in crystallization treatment and hence it is preferable that at least one of them be contained. To produce crystal nuclei, it is preferable that the total content, $SnO_2+ZrO_2$, of $SnO_2$ and $ZrO_2$ be 0.5% or more, even preferably 1% or more. To increase the transparency by forming a number of crystal nuclei, it is preferable that their total content be 3% or more, even preferably 4% or more, further preferably 5% or more, particularly preferably 6% or more, and most preferably 7% or more. Further, to make defects due to unmelted substances less prone to occur in the glass, it is preferable that their total content be 12% or less, even preferably 10% or less, further preferably 9% or less, and particularly preferably 8% or less.

To allow precipitation of β-spodumene crystals, it is preferable that the content of $SnO_2$ be 0.5% or more. It is even preferable that the content of $SnO_2$ be 1% or more, further preferably 1.5% or more. The content of $SnO_2$ being 6% or less is preferable because defects due to unmelted substances are less prone to occur in the glass. It is even preferable that the $SnO_2$ content be 5% or less, further preferably 4% or less.

$SnO_2$ is also a component for increasing the solarization resistance. To suppress solarization, it is preferable that the content of $SnO_2$ be 1% or more, even preferably 1.5% or more.

In general, $TiO_2$ and $ZrO_2$ are known as components for forming crystal nuclei of glass ceramic. According to a study by the present inventors, in the composition of the present invention, $ZrO_2$ was more effective than $TiO_2$. And addition of $SnO_2$ increased the transparency of glass ceramic.

It is preferable that the content of $ZrO_2$ be 0.5% or more, even preferably 1% or more. On the other hand, where the $ZrO_2$ content is 6% or less, devitrification is less prone to occur at the time of melting and hence quality degradation of the chemically strengthened glass can be suppressed. It is preferable that the content of $ZrO_2$ be 6% or less, even preferably 5% or less and further preferably 4% or less.

Where $SnO_2$ and $ZrO_2$ are both contained, it is preferable that the ratio, $SnO_2/(SnO_2+ZrO_2)$, of the $SnO_2$ content to their total content be 0.3 or more, even preferably 0.35 or more and further preferably 0.45 or more in order to increase transparency.

To increase the strength, it is preferable that $SnO_2/(SnO_2+ZrO_2)$ be 0.7 or less, even preferably 0.65 or less and further preferably 0.6 or less.

$TiO_2$ may be contained because it becomes a component for forming crystal nuclei of the glass ceramic. Where $TiO_2$ is contained, it is preferable that its content be 0.1% or more, even preferably 0.15% or more and further preferably 0.2% or more. On the other hand, it is preferable that the content of $TiO_2$ be 5% or less because in that case devitrification is less prone to occur at the time of melting and hence quality degradation of the chemically strengthened glass can be suppressed. It is preferable that the $TiO_2$ content be 3% or less and even preferably 1.5% or less.

If glass also contains $TiO_2$ in a case that it contains $Fe_2O_3$, a complex called an ilmenite complex is formed and the glass is prone to be colored yellow or brown. Since $Fe_2O_3$ is usually contained in glass as impurities, to prevent coloration it is preferable that the content of $TiO_2$ be 1% or less, even preferably 0.5% or less, and further preferably 0.25% or less. It is particularly preferable that substantially no $TiO_2$ be contained.

Although $P_2O_5$ is not indispensable, it may be contained because it has an effect of accelerating crystallization by promoting glass phase splitting. Where $P_2O_5$ is contained, it is preferable that its content be 0.1% or more, even preferably 0.5% or more, further preferably 1% or more, and particularly preferably 2% or more.

On the other hand, if the content of $P_2O_5$ is too large, the chemically strengthened glass deteriorates in crushability and acid resistance thereof lowers to a large extent. It is preferable that the content of $P_2O_5$ be 6% or less, even preferably 5% or less, further preferably 4% or less, particularly preferably 3% or less, and most preferably 2% or less. To increase the acid resistance further, it is preferable that substantially no $P_2O_5$ be contained.

$B_2O_3$ may be contained because it is a component for increasing the chipping resistance and the meltability of the glass for chemical strengthening or the chemically strengthened glass. Although $B_2O_3$ is not indispensable, where $B_2O_3$ is contained, to increase the meltability it is preferable that its content be 0.5% or more, even preferably 1% or more and further preferably 2% or more.

On the other hand, if the content of $B_2O_3$ is more than 5%, striae are prone to occur at the time of melting to lower the quality of the glass for chemical strengthening. Thus, it is preferable that the $B_2O_3$ content be 5% or less, even preferably 4% or less, further preferably 3% or less, and particularly preferably 1% or less. To increase the acid resistance, it is preferable that substantially no $B_2O_3$ be contained.

MgO may be contained because it is a component for increasing the compressive stress by chemical strengthening and a component for suppressing scattering of fragments when the strengthened glass is broken. Where MgO is contained, it is preferable that its content be 0.5% or more, even preferably 1% or more. On the other hand, to suppress devitrification at the time of melting, it is preferable that the content of MgO be 5% or less, even preferably 4% or less and further preferably 3% or less.

CaO is a component for increasing the meltability of glass and may be contained to increase the meltability while preventing devitrification at the time of melting and suppressing increase of the thermal expansion coefficient. Where CaO is contained, it is preferable that the content of CaO be 0.5% or more, even preferably 1% or more. On the other hand, to improve the ion exchange properties, it is preferable that the CaO content be 4% or less, even preferably 3% or less and particularly preferably 2% or less.

SrO is a component for increasing the glass meltability and may be contained because it can increase the transmittance of the glass ceramic by increasing the refractive index of the glass and thereby making the refractive index of a residual glass phase remaining after crystallization closer to the refractive index of precipitated crystals.

Where SrO is contained, it is preferable that its content be 0.1% or more, even preferably 0.5% or more and further preferably 1% or more. On the other hand, the ion exchange rate lowers if the SrO content is too large. From this point of view, it is preferable that the SrO content be 3% or less, even preferably 2.5% or less, further preferably 2% or less, and particularly preferably 1% or less.

BaO is a component for increasing the glass meltability and may be contained because it can increase the transmittance of the glass ceramic by increasing the refractive index of the glass and thereby making the refractive index of a residual glass phase remaining after crystallization closer to the refractive index of a lithium aluminosilicate crystal phase.

Where BaO is contained, it is preferable that its content be 0.1% or more, even preferably 0.5% or more and further preferably 1% or more. On the other hand, the ion exchange rate lowers if the BaO content is too large. From this point of view, it is preferable that the BaO content be 3% or less, even preferably 2.5% or less, further preferably 2% or less, and particularly preferably 1% or less.

ZnO is a component for decreasing the thermal expansion coefficient and increasing the chemical durability of the glass. Furthermore, ZnO can increase the transmittance of the glass ceramic by increasing the refractive index of the glass and thereby making the refractive index of a residual glass phase remaining after crystallization closer to the refractive index of a lithium aluminosilicate crystal phase. As such, ZnO may be contained.

Where ZnO is contained, it is preferable that its content be 0.5% or more, even preferably 1% or more, further preferably 1.5% or more, and particularly preferably 2% or more. On the other hand, to suppress devitrification at the time of melting, it is preferable that the ZnO content be 4% or less, even preferably 3% or less and further preferably 2% or less.

Each of $Y_2O_3$, $La_2O_3$, $Nb_2O_5$, and $Ta_2O_5$ has an effect of suppressing scattering of fragments when glass is broken and may be contained to increase the refractive index. Where these components are contained, it is preferable that the total content, $Y_2O_3+La_2O_3+Nb_2O_5$, of $Y_2O_3$, $La_2O_3$ and $Nb_2O_5$ be 0.5% or more, even preferably 1% or more, further preferably 1.5% or more, and particularly preferably 2% or more. To make glass devitrification less prone to occur at the time of melting, it is preferable that the content $Y_2O_3+La_2O_3+Nb_2O_5$ be 4% or less, even preferably 3% or less, further preferably 2% or less, and particularly preferably 1% or less.

It preferable that the total content, $Y_2O_3+La_2O_3+Nb_2O_5+TaO_5$, of $Y_2O_3$, $La_2O_3$, $Nb_2O_5$ and $TaO_5$ be 0.5% or more, even preferably 1% or more, further preferably 1.5% or more, and particularly preferably 2% or more. To make glass devitrification less prone to occur at the time of melting, it is preferable that the content $Y_2O_3+La_2O_3+Nb_2O_5+TaO_5$ be 4% or less, even preferably 3% or less, further preferably 2% or less, and particularly preferably 1% or less.

$CeO_2$ has an effect of oxidizing glass and may be contained when $SnO_2$ is contained at a large proportion because in some case $CeO_2$ may suppress coloration by suppressing reduction of $SnO_2$ to SnO which is a coloration component. Where $CeO_2$ is contained, it is preferable that its content be 0.03% or more, even preferably 0.05% or more and further preferably 0.07% or more. Where $CeO_2$ is used as an oxidizing agent, too large a content of $CeO_2$ makes glass coloration prone to occur. Thus, to increase the transparency, it is preferable that the $CeO_2$ content be 1.5% or less, even preferably 1.0% or less.

Furthermore, coloration components may be added in such a range as not to impair attainment of desired chemical strengthening properties. Example preferable coloration components are $Co_3O_4$, $MnO_2$, $Fe_2O_3$, NiO, CuO, $Cr_2O_3$, $V_2O_5$, $Si_2O_3$, $SeO_2$, $Er_2O_3$, $Nd_2O_3$. It is preferable that the total content of coloration components be 1% or less. To obtain even higher glass transparency, it is preferable that none of these components be substantially contained.

$SO_3$, a chloride, a fluoride, or the like may be contained as appropriate to serve as a refining agent or the like at the time of melting of glass. It is preferable that $As_2O_3$ not be contained. Where $Sb_2O_3$ is contained, it is preferable that its content be 0.3% or less, even preferably 0.1% or less. It is most preferable that $Sb_2O_3$ not be contained.

If the average thermal expansion coefficient is large, distortion or cracks are prone to occur at the time of cooling. Thus, it is preferable that the average thermal expansion coefficient of the amorphous glass in a range of 50° C. to 500° C. be $100\times10^{-7}/°$ C. or less, even preferably $80\times10^{-7}/°$ C. or less and further preferably $60\times10^{-7}/°$ C. or less. If the average thermal expansion coefficient of the amorphous glass in the range of 50° C. to 500° C. is small, a difference in the degree of thermal expansion between a die and the amorphous glass occurs to prevent formation into a desired shape. Thus, it is preferable that the average thermal expansion coefficient of the amorphous glass in the range of 50° C. to 500° C. be $10\times10^{-7}/°$ C. or more, even preferably $30\times10^{-7}/°$ C. or more and further preferably $40\times10^{-7}/°$ C. or more.

If the difference between thermal expansion of a bend forming die (described later) and glass is large, it is necessary to design a die by modifying the correction factor according to a target shape. Where the bend forming die is made of carbon, if the average thermal expansion coefficient of the amorphous glass is in the above range, the thermal expansion difference between the glass and the die can be reduced, as a result of which it is not necessary to design a die by calculating a correction factor on the basis of a target shape and hence the productivity can be increased.

For example, amorphous glass can be manufactured by the following method. It is noted that the following method is an example of a case of manufacturing sheet-shaped amorphous glass.

Glass materials are mixed together so as to obtain glass having a preferable composition and melted by heating them in a glass melting furnace. Molten glass is homogenized by bubbling, stirring, addition of a refining agent, etc., formed into a glass sheet having a prescribed thickness by a known forming method, and cooled gradually.

Alternatively, molten glass may be formed into a block shape, cooled gradually, and shaped into a sheet shape by cutting.

Example methods for manufacturing a planar glass are a float method, a press method, a fusion method, and a down-draw method. In particular, the float method is preferable for manufacture of a large-size glass sheet. Continuous forming methods other than the float method, such as the fusion method and the down-draw method, are also preferable.

(Bend Forming)

The bend forming is a step of forming glass into a curved shape by heating it and cooling the formed glass quickly from a high temperature without crystallizing it. Example bend forming methods are existing bend forming methods such as a self-weight forming method, a vacuum forming method, and a press forming method, and a desired method can be selected from them. Two or more bend forming methods may be used in combination.

The self-weight forming method is a method of placing a glass sheet on a forming die and then heating it so that it is bend-formed into a prescribed shape in such a manner as to conform to the forming die by gravity.

The vacuum forming method is a method of placing a glass sheet on a forming die, sealing the circumference of the glass sheet, and then performing bend forming by providing a pressure difference between the front and back surface of the glass sheet by reducing the pressure of a space between the forming die and the glass sheet. Pressure may be applied to the top surface side of the glass sheet as an auxiliary measure.

The press forming method is a method of placing a glass sheet between forming dies (bottom die and top die) and bend-forming the glass sheet into a prescribed shape by applying a press load from the top and bottom forming dies while heating the glass sheet.

In any of the above methods, glass is deformed by applying force to it while heating it.

If the temperature of the bend-forming (hereinafter also abbreviated as "heat bending temperature") is too low, forming into a desired shape cannot be performed. Thus, it is preferable that the bend-forming temperature be 500° C. or more, even preferably 600° C. or more, further preferably 700° C. or more, and most preferably 750° C. or more. If the temperature of the bend-forming is too high, the temperature may exceed a temperature upper limit of a forming machine. Thus, it is preferable that the bend-forming temperature be 1,100° C. or less, even preferably 1,050° C. or less, and most preferably 900° C. or less.

If the viscosity of bend forming (equilibrium viscosity during bend forming) is too low, forming into a desired shape cannot be performed. Thus, it is preferable that the viscosity of bend forming be $10^8$ Pa·s or more, even preferably $10^9$ Pa·s or more and most preferably $10^{10}$ Pa·s or more. If the viscosity of bend forming is too high, it is difficult to maintain a desired shape. Thus, it is preferable that the viscosity of bend forming be $10^{13}$ Pa·s or less, even preferably $10^{12}$ Pa·s or less and most preferably $10^{11.5}$ Pa·s or less.

If the crystallization treatment temperature and the heat bending temperature are close to each other, formation of crystal nuclei or crystal growth may occur. It is therefore preferable that the difference between them be 5° C. or more, even preferably 10° C. or more and further preferably 15° C. or more. To suppress transmittance reduction by bend forming, it is preferable that the difference between the maximum temperature of the crystallization treatment and the heat bending temperature be 200° C. or less, even preferably 150° C. or less, further preferably 130° C. or less, and particularly preferably 100° C. or less.

When it is desired to accelerate formation of nuclei at the time of heat bending, it is preferable that the difference between the nuclei formation temperature and the heat bending temperature be 10° C. or less. On the other hand, from the viewpoint of crystal control in a process, it is desirable to form nuclei at the time of crystallization treatment. In that case, it is preferable that the temperature difference be 10° C. or more.

Where the heat bending temperature is higher than the crystallization treatment temperature, the transmittance may be lowered by bend forming. It is preferable that the transmittance reduction by bend forming be 3% or less, even preferably 2% or less, further preferably 1.5% or less, and particularly preferably 1% or less.

To maintain the transparency of final glass at high value, it is advantageous that the light transmittance before bend forming is high. Thus, it is preferable that the light transmittance converted into a value corresponding to a thickness of 0.8 mm be 85% or more, even preferably 87% or more and particularly preferably 89% or more.

It is preferable that the absolute value of the difference between an average thermal expansion coefficient of the amorphous glass in a temperature range of 50° C. to 500° C. and an average thermal expansion coefficient of the die used for bend forming in the temperature range of 50° C. to 500° C. be $150 \times 10^{-7}/°$ C. or less, even preferably $100 \times 10^{-7}/°$ C. or less, further preferably $50 \times 10^{-7}/°$ C. or less, and most preferably $30 \times 10^{-7}/°$ C. or less.

If the difference between the thermal expansion of the die used for bend forming and the thermal expansion of the glass is large, the releasability of the glass is low and hence it becomes necessary to design a die taking into consideration a correction factor that is determined on the basis of the difference between an expansion coefficient of the glass and an expansion coefficient of the die, resulting in reduction in productivity. If the absolute value of the difference is $150 \times 10^{-7}/°$ C. or less, the difference between the thermal expansion of the die used for bend forming and the thermal expansion of the glass is small, it is not necessary to design a die that is suitable for a target shape and hence the productivity can be increased.

Since the average thermal expansion coefficient of the amorphous glass employed in the present invention in a temperature range of 50° C. to 500° C. is similar to that of carbon, it is preferable to perform bend forming using a carbon die that is made of carbon. This makes it possible to increase the strength by suppressing occurrence of stress differences at the time of forming and to realize high dimension stability and forming accuracy without the need for performing a significant correction.

If the average thermal expansion coefficient of the amorphous glass employed in the present invention in the temperature range of 50° C. to 500° C. is too large, it becomes difficult to obtain a desired shape. Thus, it is preferable that the average thermal expansion coefficient of the amorphous glass be $170 \times 10^{-7}/°$ C. or less, even preferably $160 \times 10^{-7}/°$ C. or less and further preferably $150 \times 10^{-7}/°$ C. or less. Where a carbon die is used, it is particularly preferable that the average thermal expansion coefficient be $60 \times 10^{-7}/°$ C. or less. If the thermal expansion coefficient is too small, the releasability from the die lowers. Thus, it is preferable that the average thermal expansion coefficient of the amorphous glass be $20 \times 10^{-7}/°$ C. or more, even preferably $30 \times 10^{-7}/°$ C. or more and further preferably $40 \times 10^{-7}/°$ C. or more.

From the viewpoint of suppressing crystal growth during forming, it is preferable that the difference between the glass transition temperature of the amorphous glass employed in the present invention and a highest temperature of the crystallization treatment be 10° C. or more, even preferably 20° C. or more and further preferably 30° C. or more.

(2) Step of Obtaining Glass Ceramic Having a Three-Dimensional Shape by Crystallizing the Three-Dimensionally Shaped Amorphous Glass by Heat Treatment Step (2) is a step of obtaining glass ceramic having a three-dimensional shape by subjecting the three-dimensionally shaped amorphous glass obtained in step (1) to heat treatment.

It is preferable that the heat treatment performed in step (2) is a two-step heat treatment in which the temperature is increased from room temperature to a first treatment temperature and kept at the first treatment temperature for a prescribed time and then the temperature is increased to a second treatment temperature that is higher than the first treatment temperature and then kept at the second treatment temperature for a prescribed time.

Where the two-step heat treatment is employed, it is preferable that the first treatment temperature is in such a temperature range that the growth rate of crystal nuclei for the glass composition is high and it is preferable that the second treatment temperature is in such a temperature range that the crystal growth rate for the glass composition is high. It is preferable that the time during which the first treatment temperature is kept be so long that a sufficient number of crystal nuclei grow. When a large number of crystal nuclei have grown, the size of each crystal becomes small, whereby highly transparent glass ceramic can be obtained.

The first treatment temperature is, for example, 550° C. to 800° C. and the second treatment temperature is, for example, 850° C. to 1,000° C. The first treatment temperature is maintained for 2 to 10 hours and then the second treatment temperature is maintained for 2 to 10 hours.

If necessary, the glass ceramic having a three-dimensional shape obtained according to the above procedure is subjected to grinding and polishing processing. Where the glass ceramic sheet is cut into a prescribed shape and size or subjected to chamfering processing, cutting or chamfering the glass ceramic sheet before it is subjected to the chemically strengthening treatment is preferable because compressive stress layers are formed in the end surfaces by the subsequent chemically strengthening treatment.

<Manufacturing Method of Chemically Strengthened Glass Having a Three-Dimensional Shape>

The manufacturing method of chemically strengthened glass having a three-dimensional shape of the present invention includes the following steps (1) to (3):

(1) a step of obtaining three-dimensionally shaped amorphous glass by bend-forming amorphous glass while heating it;

(2) a step of obtaining glass ceramic having a three-dimensional shape by crystallizing the three-dimensionally shaped amorphous glass by heat treatment; and (3) a step of chemical strengthening the glass ceramic having a three-dimensional shape obtained in step (2).

Steps (1) and (2) are the same as those described above in <Manufacturing method of glass ceramic having a three-dimensional shape>. Step (3) will be described below.

The chemically strengthening treatment is a treatment for replacing metal ions having a small ion radius (typically, Na ions or Li ions) in the glass with metal ions having a large ion radius (typically, Na ions or K ions for Li ions, and K ions for Na ions) by bringing the glass into contact with a metal salt by, for example, a method of immersing the glass in a melt of a metal salt (e.g., potassium nitrate) containing metal ions having a large ion radius (typically, Na ions or K ions).

To increase the rate of the chemically strengthening treatment, it is preferable to employ "Li—Na exchange" in which Li ions in the glass is replaced by Na ions. To produce large compressive stress by ion exchange, it is preferable to employ "Na—K exchange" in which Na ions in the glass is replaced by K ions.

Example molten salts to be used for the chemically strengthening treatment are a nitrate salt, a sulfate salt, a carbonate salt, and a chloride salt. Among them, example nitrate salts are lithium nitrate, sodium nitrate, potassium nitrate, cesium nitrate, and silver nitrate. Example sulfate salts are lithium sulfate, sodium sulfate, potassium sulfate, cesium sulfate, and silver sulfate. Example carbonate salts are lithium carbonate, sodium carbonate, and potassium carbonate. Example chloride salts are lithium chloride, sodium chloride, potassium chloride, cesium chloride, and silver chloride. One of these molten salts may be used singly or plural kinds of these molten salts may be used in combination.

As for the treatment conditions of the chemically strengthening treatment, a proper time, temperature, etc. may be selected taking a glass composition, a kind of molten salt, etc. into consideration.

It is preferable to obtain chemically strengthened glass of the present invention by the following two-step chemically strengthening treatment, for example.

First, as the first-step chemically strengthening treatment, glass ceramic having a three-dimensional shape is immersed in a metal salt containing Na ions (e.g., sodium nitrate) of about 350° C. to 500° C. for 0.1 to 10 hours. As a result, ion exchange occurs between Li ions in the glass ceramic and Na ions in the metal salt, whereby a compressive stress layer can be formed in which, for example, a surface compressive stress value ($CS_0$) is 200 MPa or more and a depth of compressive stress layer is 80 μm or more. On the other hand, if the surface compressive stress value ($CS_0$) is more than 1,000 MPa, it is difficult to increase DOL while keeping CT small. It is therefore preferable that the surface compressive stress value be 900 MPa or less, even preferably 700 MPa or less and further preferably 600 MPa or less.

Then, as the second-step chemically strengthening treatment, the glass ceramic is immersed in a metal salt containing K ions (e.g., potassium nitrate) of about 350° C. to 500° C. for 0.1 to 10 hours. As a result, large compressive stress occurs in a portion that is, for example, about 10 μm or less in depth of the compressive stress layer formed by the preceding treatment.

According to the above two-step treatment, a preferable stress profile in which the surface compressive stress value ($CS_0$) is 600 MPa or more can be obtained easily.

Glass ceramic may be immersed in a metal salt containing K ions after it was first immersed in a metal salt containing Na ions and then hold at 350° C. to 500° C. for 1 to 5 hours in the air. It is preferable that the holding temperature be 325° C. or more, even preferably 340° C. or more. And it is preferable that the holding temperature be 475° C. or less, even preferably 460° C. or less.

By holding the glass ceramic at a high temperature in the air, Na ions that have been introduced into the inside of the glass from the metal salt in the first-step treatment are diffused thermally in the glass, whereby an even preferable stress profile can be formed.

Instead of holding the glass ceramic in the air after it was immersed in the metal salt containing Na ions, it may be immersed in a metal salt containing Na ions and Li ions (e.g., a mixed salt of sodium nitrate and lithium nitrate) of 350° C. to 500° C. for 0.1 to 20 hours.

By immersing the glass ceramic in the metal salt containing Na ions and Li ions, ion exchange occurs between Na ions in the glass and Li ions in the metal salt, whereby an even preferable stress profile is formed and the asphalt drop strength is thereby increased.

Where the above-described two-step or three-step strengthening treatment is performed, it is preferable that the total treatment time be 10 hours or less, even preferably 5 hours or less and further preferably 3 hours or less. On the other hand, to obtain a desired stress profile, the total treatment time of 0.5 hour or more is necessary. It is even preferable that the treatment time be 1 hour or more.

The glass having a three-dimensional shape of the present invention is particularly useful as a cover glass of a display device of, for example, a mobile device such as a cellphone or smartphone. Furthermore, it is useful as a cover glass of a non-portable display device such as a TV receiver, a personal computer, or a touch panel. It is also useful as a cover glass of interior decorations, for example, of an automobile, an airplane, or the like.

EXAMPLES

The present invention will be described below using Examples, but the invention is not restricted by them. Blanks in Tables mean that no measurement value exists.

[Evaluation Methods]
(Glass Transition Temperature)

A glass transition temperature was measured using a thermal expansion meter ("TD5000SA" produced by Bruker AXS Inc.).

(Retardations)

A retardation value was measured at one or more points on a circular arc of each R-shape using a birefringence measuring instrument ("WPA-100" produced by Photonic Lattice, Inc.) by irradiating glass with light having a wavelength of 543 nm.

(Haze Value)

A haze value of the largest R-shape was measured using a haze meter ("HZ-2" produced by Suga Test Instruments Co., Ltd.) according to JIS K3761: 2000.

(Thermal Expansion Coefficient)

A thermal expansion curve was obtained using a thermal expansion meter ("TD5000SA" produced by Bruker AXS Inc.) by setting a temperature increase rate at 10° C./min. An average thermal expansion coefficient (unit: $\times 10^{-7}/°$ C.) in a temperature range of 50° C. to 500° C. was measured from the thus-obtained thermal expansion curve.

(Precipitated Crystals)

A powder X-ray diffraction measurement was performed under the following conditions and precipitated crystals (main crystals) were identified:

Measuring instrument: "SmartLab" produced by Rigaku Corporation
X-ray used: CuK α-rays
Measurement range: 2θ=10° to 80°
Speed: 10°/min
Step: 0.02°

(Average Radius of Curvature)

As for an average radius of curvature, first, coordinates in the height direction of a sample surface with respect to a cross section direction were measured at intervals of 0.1 mm using a three-dimensional measuring machine ATOS (type number: ATOS Triple Scan III) produced by GOM GmbH. A general expression of an approximated circle obtained by the least squares method was then determined and finally an average radius of curvature was calculated.

[Manufacture of Glass]

Referential Example 1

Glass materials were mixed together so as to obtain glass weighing 800 g and having each of compositions A-I shown in Table 1 in mass % in terms of oxides, put into a platinum crucible, and melted at 1,400° C. to 1,700° C. for 5 hours in an electric furnace. Defoamed and homogenized molten glass was poured into a die, held at a temperature that is higher than a glass transition temperature by about 30° C. for 1 hour, and cooled to room temperature at a cooling rate of 0.5° C./min, whereby a glass block was obtained. A glass sheet having a thickness of 0.55 mm and test pieces for evaluation of glass physical properties were obtained from the glass block. The surface of the glass sheet was mirror-finished.

Table 1 shows measurement results of a glass transition temperature and a thermal expansion coefficient of each glass sheet obtained.

sheet 13 (80 mm×50 mm; having R-shape in corners) having composition A was C-chamfered in ranges of 0.2 mm from the glass end surfaces. The term "having R-shape in corners" means that four corners having R-shape are seen when a preform is seen from right above. The chamfering was performed using a grit 600 whetstone (produced by Tokyo Diamond Tools Mfg. Co., Ltd.) so that the surface roughness (arithmetic average surface roughness of chamfered portions) of 450 nm was obtained.

A carbon female die 11 and male die 12 were prepared that were designed so as to be able to form a bent surface having a radius of curvature of 6.0 mm and a bend depth of 4.0 mm, and the chamfered glass sheet 13 was placed on the glass contact surface of the female die 11 approximately at its center.

The glass sheet 13 was heated preliminarily, deformed, and cooled in a state that the female die 11 and the male die 12 mounted with the glass sheet 13 were fixed to the bottom shaft and the top shaft, respectively, of a forming machine (glass device forming machine "GMP-315V" produced by Toshiba Machine Co., Ltd.)

In the preliminary heating step among the above steps, the temperature was increased from room temperature to 600° C. in 15 minutes. At 600° C., the equilibrium viscosity of the

TABLE 1

| | Composition A | Composition B | Composition C | Composition D | Composition E | Composition F | Composition G | Composition H | Composition I |
|---|---|---|---|---|---|---|---|---|---|
| $SiO_2$ | 60.9 | 62.9 | 65.4 | 62.9 | 63.1 | 63.4 | 63.4 | 63.3 | 63.5 |
| $Al_2O_3$ | 12.8 | 22.4 | 22.4 | 22.4 | 22.5 | 22.5 | 22.5 | 22.5 | 22.5 |
| $Li_2O$ | 0 | 4.3 | 4.3 | 4.3 | 4.3 | 4.3 | 4.3 | 4.3 | 4.3 |
| $Na_2O$ | 12.2 | 2.0 | 2.0 | 2.0 | 2.0 | 2.0 | 2.0 | 2.0 | 2.0 |
| $K_2O$ | 5.9 | 0 | 0 | 0 | 0 | 0 | 0 | 0 | 0 |
| $ZrO_2$ | 1 | 2.3 | 2.3 | 2.3 | 2.3 | 2.3 | 2.3 | 2.3 | 2.3 |
| $SnO_2$ | 0 | 2.1 | 2.1 | 2.1 | 2.1 | 2.1 | 2.1 | 2.1 | 2.1 |
| $P_2O_5$ | 0 | 3.0 | 1.5 | 3.0 | 3.0 | 3.0 | 3.0 | 3.0 | 3.0 |
| MgO | 6.7 | 0 | 0 | 0 | 0 | 0 | 0 | 0 | 0 |
| CaO | 0.1 | 0 | 0 | 0 | 0 | 0 | 0 | 0 | 0 |
| SrO | 0.2 | 1 | 0 | 0 | 0 | 0 | 0.5 | 0 | 0.3 |
| BaO | 0.2 | 0 | 0 | 1 | 0 | 0.3 | 0 | 0 | 0 |
| ZnO | 0 | 0 | 0 | 0 | 0.6 | 0 | 0 | 0.4 | 0 |
| $TiO_2$ | 0 | 0 | 0 | 0 | 0 | 0 | 0 | 0 | 0 |
| $B_2O_3$ | 0 | 0 | 0 | 0 | 0 | 0 | 0 | 0 | 0 |
| Glass transition temp. (° C.) | — | 714 | 739 | 718 | 697 | 711 | 715 | 703 | 715 |
| Thermal expansion coefficient ($\times 10^{-7}$/° C.) | — | 50 | 49 | 51 | — | 54 | 46 | — | — |

Compositions B-I are example compositions that are suitable for the present invention. Glass ceramic containing β-spodumene crystals are obtained by performing heat treatment on the glass sheets having these respective compositions. For compositions B-D, F, and G, the thermal expansion coefficient is within a range of $40 \times 10^{-7}$/° C. to $60 \times 10^{-7}$/° C., when a carbon die is used for bend forming, the difference between thermal expansion of the glass and that of die can be reduced, whereby it is not necessary to design a die through calculation for a target shape and hence the productivity can be increased.

Example 1

Figure 5:
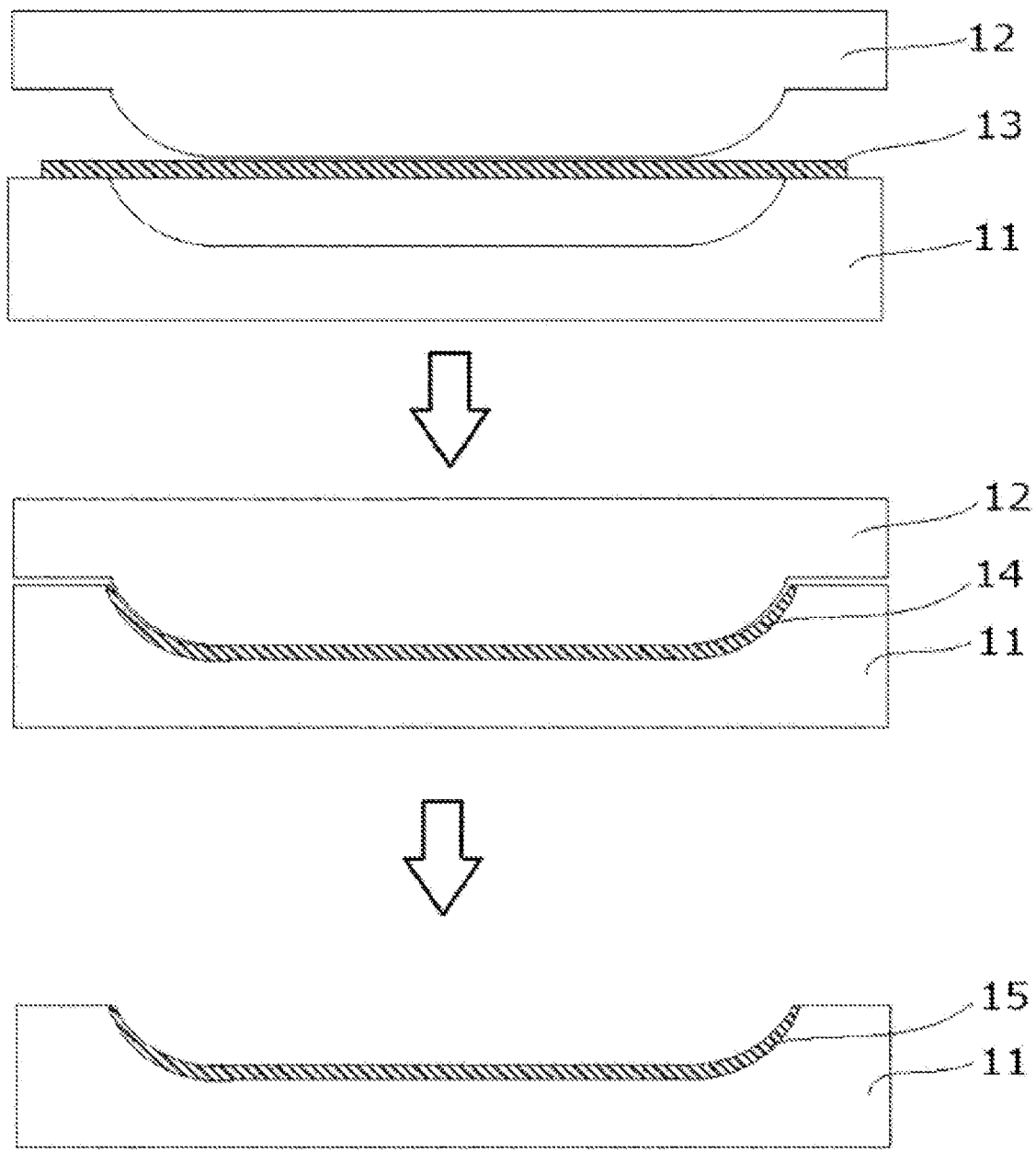
FIG. 5 is a schematic diagram showing one mode of execution of a manufacturing method of glass having a three-dimensional shape of the present invention.

FIG. 5 is a schematic diagram showing one mode of embodiment of the manufacturing method of glass having a three-dimensional shape of the present invention. A glass glass sheet 13 was about $10^{13}$ Pa·s. Then the temperature was increased from 600° C. to 645° C. in five minutes. At 645° C., the equilibrium viscosity of the glass sheet 13 was about $10^{11.5}$ Pa·s.

In a state that the equilibrium viscosity of a central portion of the glass sheet 13 was kept in a range of $10^{11}$ to $10^{12}$ Pa·s (the temperature was kept in a range of 640° C. to 650° C.), the male die 12 was moved downward so as to push the female die 11 at a maximum of 2,000 N for three minutes. During that time, nitrogen gas was blown in at 20 L/min through penetration holes (not shown) formed through the male die 12 so that a glass sheet 14 was formed uniformly.

Then gradual cooling was done to 480° C. for 20 minutes. The equilibrium viscosity of the glass sheet at 480° C. was about $10^{21}$ Pa·s. Subsequently, the male die 12 was elevated at a rate of 2 mm/sec and caused to escape and the glass sheet 14 was cooled to room temperature in the air.

At room temperature, the glass sheet 14 had the smallest R-shape having an average radius of curvature of 6.0 mm, a bend depth of 4.0 mm, and the largest R-shape having an average radius of curvature of $3.8 \times 10^3$ mm. The largest R-shape was included in a portion where the inside back surface and the outside front surface of the glass sheet 14 were approximately parallel with each other.

Retardations were measured by perpendicularly irradiating the surface having the smallest R-shape of the glass sheet 14 with light having a wavelength of 543 nm. A maximum retardation value was 22 nm/mm.

Example 2

A glass sheet 13 having composition B was chamfered in the same manner as in Example 1. The glass sheet 13 was bend-formed in the same manner as in Example 1, whereby a glass sheet 14 was obtained in which the smallest R-shape had an average radius of curvature of 6.0 mm, a bend depth was 4.0 mm, and the largest R-shape had an average radius of curvature of $3.8 \times 10^3$ mm. The largest R-shape was included in a portion where the inside back surface and the outside front surface of the glass sheet 14 were approximately parallel with each other.

Thus-obtained glass sheet 14 was held at 750° C. for four hours in a state that it is kept mounted on the male die 12, and then held at 900° C. for four hours to perform crystallization, whereby glass ceramic 15 having a three-dimensional shape was obtained.

Retardations in the largest R-shape of the thus-obtained glass ceramic 15 having a three-dimensional shape were measured in the same manner as in Example 1. A maximum retardation value in the largest R-shape was 1.9 nm/mm. Furthermore, a haze value measured in the largest R-shape was 0.29%.

Example 3

A glass sheet 13 having composition B was chamfered in the same manner as in Example 2, and then crystallized by performing heat treatment in the same manner as in Example 2, whereby glass ceramic sheet was obtained. The thus-obtained glass ceramic sheet was placed on the male die 12 and subjected to bend forming under the same conditions as in Example 2, whereby glass ceramic having a three-dimensional shape was obtained.

In the thus-obtained glass ceramic having a three-dimensional shape, the smallest R-shape had an average radius of curvature of 5.7 mm, a bend depth was 4.2 mm, and the largest R-shape had an average radius of curvature of 12,900 mm. Furthermore, a haze value measured in the largest R-shape was 3.0%.

Examples 4-6

Glass ceramics having a three-dimensional shape were obtained in the same manner as in Example 2 except that glass compositions, manners of crystallization treatment, forming timing, and forming conditions shown in Table 2 were employed.

Table 2 shows evaluation results of the thus-obtained glass having a three-dimensional shape. In Table 2, as for "crystallization treatment", in the case where two sets of treatment conditions are arranged vertically, the crystallization treatment is that a glass sheet was held at the temperature shown upper part for the time shown upper part and then held at the temperature shown lower part for the time shown lower part. For example, "750° C.-4 h" and "920° C.-4 h" that are shown upper part and lower part, respectively, mean that a glass sheet was held at 750° C. for four hours and then held at 920° C. for four hours.

"Before crystallization" written in a "forming timing" box means that forming and crystallization were performed in this order. "After crystallization" written in a "forming timing" box means that crystallization and forming were performed in this order. "Haze" means a haze value obtained after forming and crystallization. "ΔHaze" means the difference between a haze value obtained after forming and crystallization and a haze value obtained before forming and crystallization. "Shape deviation" means a deviation from a target shape.

Table 2 shows evaluation results of the glass ceramics obtained in the above-described manners. Examples 2 and 4 are Inventive Examples and Examples 1, 3, 5, and 6 are Comparative Examples. In Examples 2-6, precipitated crystals were β-spodumene crystals.

TABLE 2

| Glass | Example 1 Composition A | Example 2 Composition B | Example 3 Composition B | Example 4 Composition C | Example 5 Composition C | Example 6 Composition C |
|---|---|---|---|---|---|---|
| Crystallization treatment | None | 750° C.-4 h 900° C.-4 h | 750° C.-4 h 900° C.-4 h | 750° C.-4 h 920° C.-4 h | 750° C.-4 h 920° C.-4 h | 750° C.-4 h 920° C.-4 h |
| Forming timing | — | Before crystallization | After crystallization | Before crystallization | After crystallization | After crystallization |
| Forming conditions | 645° C.-3 min | 770° C.-3 min | 1,050° C.-6 min | 795° C.-3 min | 1,050° C.-3 min | 1,150° C.-3 min |
| Haze (%) | 0.05 | 0.3 | 3 | 0.5 | — | 100 |
| ΔHaze (%) | 0.01 | 0.01 | 2.7 | 0.05 | — | 99.7 |
| Shape deviation (mm) | 0.251 | 0.228 | — | 0.245 | Cracks | — |
| Retardation (nm/mm) | 22 | 1.9 | — | 1.5 | — | — |

As shown in Table 2, in Examples 2 and 4 in each of which glass having a three-dimensional shape of the present invention was produced, a maximum value of retardations was 20 nm or less and the strength and shape stability (forming stability) were higher than in Example 1 which is a Comparative Example. Furthermore, a haze value in the largest R-shape was 1.0% or less and the transparency was high.

In Examples 2 and 4 in each of which amorphous glass that satisfied the composition range prescribed in the present invention was crystallized after bend forming, haze deterioration due to heating at the time of forming was made lower than in Examples 3 and 6 in which bend forming was performed after crystallization, whereby high transparency was realized.

In Examples 2 and 4 in each of which amorphous glass that satisfied the preferable composition range of the present invention was crystallized after bend forming, the shape deviation was small and a sample whose shape was close to a target shape was obtained.

As described above, it has been found that the manufacturing method of glass having a three-dimensional shape of the present invention can increase the strength by reducing stress differences that occurred at the time of forming by heat treatment for crystallization and can realize high transparency by suppressing haze deterioration.

Although the present invention has been described in detail by referring to the particular embodiments, it is apparent to those skilled in the art that various changes and modifications are possible without departing from the spirit and scope of the invention. The present application is based on Japanese Patent Application No. 2019-072736 filed on Apr. 5, 2019, the disclosure of which is incorporated herein by reference.

INDUSTRIAL APPLICABILITY

The present invention can provide glass having a three-dimensional shape that is high in strength, transparency, and shape stability and a manufacturing method thereof.

DESCRIPTION OF SYMBOLS

100: Glass having a three-dimensional shape
110: Central portion
120: Peripheral portion

The invention claimed is:

1. A glass ceramic, comprising:
a glass ceramic having a three-dimensional shape and comprising a plurality of R-shapes including a smallest R-shape having an average radius of curvature of $5.0 \times 10^2$ mm or less and a largest R-shape having an average radius of curvature is $1.0 \times 10^3$ mm or more,
wherein the glass ceramic has a composition comprising, in mass % in terms of oxides, 58-74% of $SiO_2$ and greater than 0% of $SnO_2$, the glass ceramic has a haze value of 1.0% or less corresponding to a thickness of 0.8 mm in the largest R-shape and a maximum value of 20 nm/mm or less for retardations measured using a birefringence measuring instrument by perpendicularly irradiating one or more points on a circular arc of each R-shape with a light having a wavelength of 543 nm, and no retardation measurement is performed in a case that an angle formed by a tangential line of a curved surface of a central portion of a measurement sample and a tangential line of a measurement target surface is 90° or more.

2. The glass ceramic according to claim 1, wherein the composition of the glass ceramic comprises β-spodumene crystals.

3. The glass ceramic according to claim 1, wherein the glass ceramic has a light transmittance of 85% or more corresponding to a thickness of 0.8 mm in the largest R-shape.

4. A chemically strengthened glass comprising:
a compressive stress layer; and
a glass ceramic comprising crystals,
wherein the glass ceramic has a composition comprising, in mass % in terms of oxides, 58-74% of $SiO_2$ and greater than 0% of $SnO_2$, the glass ceramic has a three-dimensional shape comprising a plurality of R-shapes including a smallest R-shape having an average radius of curvature of $5.0 \times 10^2$ mm or less and a largest R-shape having an average radius of curvature is $1.0 \times 10^3$ mm or more, the compressive stress layer has a surface compressive stress value of 500 MPa or more and a depth of 80 μm or more and the glass ceramic has a maximum value of 20 nm/mm or less for retardations per a thickness of 1 mm measured by perpendicularly irradiating a central portion of the smallest R-shape with a light having a wavelength of 543 nm, and has a haze value converted into a value corresponding to a thickness of 0.8 mm of 1.0% or less in the largest R-shape.

5. The chemically strengthened glass according to claim 4, wherein the crystals of the glass ceramic are β-spodumene crystals.

6. The chemically strengthened glass according to claim 4, wherein the chemically strengthened glass has a light transmittance converted into a value corresponding to a thickness of 0.8 mm of 85% or more.

7. A cover glass of a display device comprising:
the chemically strengthened glass of claim 4.

8. A manufacturing method of a glass ceramic having a three-dimensional shape, comprising:
obtaining a three-dimensionally shaped amorphous glass comprising a plurality of R-shapes including a smallest R-shape having an average radius of curvature of $5.0 \times 10^2$ mm or less and a largest R-shape having an average radius of curvature of $1.0 \times 10^3$ mm or more by bend-forming an amorphous glass while heating it; and
crystallizing the three-dimensionally shaped amorphous glass by heat treatment such that a glass ceramic having a three-dimensional shape is obtained,
wherein the amorphous glass has a composition comprising in mass % in terms of oxides, 58-74% of $SiO_2$, 5-30% of $Al_2O_3$, 1-14% of $Li_2$—O, 0-5% of $Na_2O$, 0-2% of $K_2O$, 0.5-12% of $SnO_2$ and $ZrO_2$ in total, 0-6% of $P_2O_5$, and greater than 0% of $SnO_2$.

9. The method according to claim 8, wherein an absolute value of a difference between an average thermal expansion coefficient of the amorphous glass in a temperature range of 50° C. to 500° C. and an average thermal expansion coefficient of a bend-forming die in the temperature range of 50° C. to 500° C. is $150 \times 10^{-7}/°$ C. or less.

10. The method according to claim 8, wherein the average thermal expansion coefficient of the amorphous glass in the temperature range of 50° C. to 500° C. is $20 \times 10^{-7}/°$ C. to $170 \times 10^{-7}/°$ C.

11. A manufacturing method of a chemically strengthened glass having a three-dimensional shape, the method comprising:
obtaining a three-dimensionally shaped amorphous glass comprising a plurality of R-shapes including a smallest R-shape having an average radius of curvature of $5.0 \times 10^2$ mm or less and a largest R-shape having an average radius of curvature of $1.0 \times 10^3$ mm or more by bend-forming an amorphous glass while heating it;
crystallizing the three-dimensionally shaped amorphous glass by heat treatment such that a glass ceramic having a three-dimensional shape is obtained; and
chemically strengthening the glass ceramic having a three-dimensional shape, wherein the amorphous glass has a composition comprising, in mass % in terms of oxides, 58-74% of $SiO_2$, 5-30% of $Al_2O_3$, 1-14% of Li—O, 0-5% of $Na_2O$, 0-2% of K—O, 0.5-12% of $SnO_2$ and $ZrO_2$ in total, and 0-6% of $P_2O_5$, and greater than 0% of $SnO_2$.

12. The glass ceramic according to claim 1, wherein the composition of the glass ceramic composition further comprises, in mass % in terms of oxides, 1 to 2.1% of $SnO_2$.

13. The chemically strengthened glass according to claim 4, wherein the composition of the glass ceramic further comprises, in mass % in terms of oxides, 1 to 2.1% of $SnO_2$.

14. The method according to claim 8, wherein the composition of the amorphous glass comprises 1 to 2.1% of $SnO_2$.

15. The method according to claim 11, wherein the composition of the amorphous glass comprises 1 to 2.1% of $SnO_2$.

* * * * *